United States Patent
Feau et al.

(10) Patent No.: US 9,043,054 B2
(45) Date of Patent: May 26, 2015

(54) METHOD FOR DETERMINING THE SPEED AIR AIRCRAFT AND AIRCRAFT EQUIPPED WITH MEANS FOR IMPLEMENTATION

(75) Inventors: Julien Feau, Toulouse (FR); Hugo Francois, Saint-Jean (FR)

(73) Assignees: Airbus (S.A.S.), Blagnac Cedex (FR); Airbus Operations (S.A.S.), Toulouse Cedex (FR)

( * ) Notice: Subject to any disclaimer, the term of this patent is extended or adjusted under 35 U.S.C. 154(b) by 569 days.

(21) Appl. No.: 13/545,413

(22) Filed: Jul. 10, 2012

(65) Prior Publication Data

US 2013/0018533 A1 Jan. 17, 2013

(30) Foreign Application Priority Data

Jul. 13, 2011 (FR) ...................... 11 56434

(51) Int. Cl.
- *G06F 7/70* (2006.01)
- *G01P 5/14* (2006.01)
- *F01D 17/06* (2006.01)
- *G01P 13/02* (2006.01)

(52) U.S. Cl.
CPC . *G01P 5/14* (2013.01); *F01D 17/06* (2013.01); *G01P 13/025* (2013.01)

(58) Field of Classification Search
USPC ...................................... 701/7, 14
See application file for complete search history.

(56) References Cited

U.S. PATENT DOCUMENTS

2008/0288130 A1 11/2008 Feau
2011/0282560 A1 11/2011 Feau

FOREIGN PATENT DOCUMENTS

| EP | 0244344 | 11/1987 |
| EP | 0393730 | 10/1990 |
| FR | 2916290 | 11/2008 |
| FR | 2941551 | 7/2010 |

OTHER PUBLICATIONS

French Patent Office, Preliminary Search Report for FR 1156434, Feb. 17, 2012 (2 pgs.): French language Written Opinion (5 pgs.).

*Primary Examiner* — Calvin Cheung
(74) *Attorney, Agent, or Firm* — Wood, Herron & Evans, LLP

(57) ABSTRACT

An aircraft is equipped with engines, each engine having at least one pod and one compressor/turbine hitch. The aircraft has at least one data processing unit and at least one system at the engine level. At least one engine is equipped with at least one static pressure probe for measuring the ambient air under the pod. Also, air static pressure probes are arranged at the engine levels, with one pressure probe at the output of the compressor, at least one rotation speed sensor, for example of a blower, and ambient air temperature probes at the air input or in any compression point. The processing unit is able, from measurements performed by such probes at the engine level, to supply to at least one of the systems at the engine level, determination data for the air speed of the aircraft.

15 Claims, 1 Drawing Sheet

METHOD FOR DETERMINING THE SPEED AIR AIRCRAFT AND AIRCRAFT EQUIPPED WITH MEANS FOR IMPLEMENTATION

TECHNICAL FIELD

The invention relates to a speed determination method for an aircraft in the air, the so-called "air speed", from pressure parameters, in particular static pressure and total pressure. The invention also relates to an aircraft provided with turbine engines, in particular turbojets or turboprops, at least one of which is equipped with means adapted to implement such a method. Such turbine engines are also called hereinunder "engines".

The field of the invention is the air speed determination for an aircraft. Such determination is implemented from the knowledge of the pressure parameters: static pressure, corresponding to the atmospheric pressure, and total pressure, i.e. the total sum of the static pressure and the dynamic pressure. The dynamic pressure is created by the speed of the aircraft upon a flight, i.e. the air speed, with respect to the ambient air mass. The invention more particularly applies, but not exclusively, to aircrafts equipped with turbojets or turboprops, as more detailed hereinunder, but could be also apply to any flying craft or aircraft.

STATE OF THE ART

Pressure parameters are conventionally measured by probes being positioned in the front part of the aircraft. Such measurements are performed by static pressure takes associated with transducers and by Pitot tubes measuring the total pressure thru an integrated manometer.

For availability reasons as regards information speed and fundamental importance of such knowledge in flight control, there are three primary chains for measuring each pressure parameter and, in some architectures, a fourth so-called emergency chain.

It is now looked at having an access to speed alternative information being independent from information from conventional anemometric units being differently sensitive to a given trouble.

To have an alternative air speed piece of information for the pilot and for customers of such information allows in fact being in a position to remedy any simple or multiple defaults being able to affect the basis anemometric data.

One solution consists in estimating the aircraft speed from the lift equation starting from the incidence angle thereof and other parameters. However, at a big speed, the incidence variation substantially affects the variation of the corresponding estimated speed with a strong exchange rate. There is too a large inaccuracy resulting for the goal looked at: such solution can only be implemented in a range of low speeds and not in the whole aircraft flying field.

DISCLOSURE OF THE INVENTION

The invention aims at being able to make available an alternative air speed piece of information for a flying aircraft being sufficiently precise and workable, including in real time, and in particular in the speed field where the preceding solution is not useable. To do so, the invention uses pressure information supplied by the aircraft engines so as to reconstitute an air speed piece of information being workable in the aircraft flying control systems.

More precisely, the present invention aims at providing a determination method for an air speed implemented "at the airplane level", including in the systems of displaying—in particular in the cockpit-, monitoring, alarming—for example of the anemometric system-, navigation and flying commands for an aircraft. Such aircraft comprises engines composed each at least with one pod and one air compression/gas expansion hitch. In such a method, the air speed is a so-called engine air speed being determined from specific engine parameters resulting from measurements only performed at the level of at least one engine, namely from the static pressure from the ambient air, the so-called pod static pressure, measured under the pod of the engine, and from the total pressure, the so-called engine total pressure, being determined from engine parameter values thru modelling means for an aerodynamic field and/or a thermodynamic cycle of at least one component of the engine. The expression "under the pod" means between the external cowl and the internal cowl of such pod.

The determination of the engine air speed is performed either at the airplane level, or in an intermediate processing at the engine level, and then transmitted to the airplane level so as to define the airspeed under a form adapted to the needs.

Thus, engine air speed information is developed from pressure measurements carried out at the engine level, independently from the parameter values supplied by anemometric units.

In particular, the determination of the engine total pressure can call out, beside measurements of pod static pressure, measurements of parameters selected amongst the air static pressure at the engine level, the so-called engine static pressure, at least one compression output pressure, the rotation speed of at least one compression/expansion hitch and the ambient air temperature.

Preferably, when the engine is provided with a blower, the engine static pressure is measured upstream and/or downstream from the blower or, in the absence of a blower, in the air input conduit of the engine.

Advantageously, the conventional speed and Mach number data are developed thru a processing of pod static pressure and engine total pressure data transmitted at the airplane level. Moreover, such data can form as many alternative sources of speed information as numbers of engines the aircraft is equipped with.

Preferably, at least one system at the airplane level of the aircraft receives the determination parameters for the engine air speed and anemometric speed data so as to form different sources being able to be implemented by the system according to the needs thereof.

The invention also relates to an aircraft wherein the air speed supplying method at the airplane level above defined can be implemented. Such an aircraft is equipped with engines, each engine being composed with at least one pod and at least one compressor/turbine hitch, for example a high pressure (HP below) hitch and a low pressure (BP below) hitch, of at least one engine data processing unit, as well as an airplane system of displaying, in particular in the cockpit, monitoring, navigation, alarming and flying commands at the airplane level in connection with such unit. In such aircraft, at least one engine is provided at least with one static pressure probe of ambient air arranged under the pod, of at least one engine static pressure probe, of at least one rotation speed sensor of the engine, of at least one output pressure probe for a compressor stage et of at least one ambient air temperature probe. Such probes and sensors (here detectors) are connected to the processing unit being able to transmit, from measurements supplied by at least one part of the detectors at the input of modeling means for an aerodynamic field and/or a thermodynamic cycle of at least one component of at least one engine, engine data for determining the air speed to at least one of the systems at the airplane level.

In particular, such system(s) at the airplane level is or are equipped with a device able to process the pod static pressure and engine total pressure data so as to determine air speed data under the form of conventional speed and Mach number. Alternatively and additionally, the processing unit is also equipped with such a pressure data processing device.

The aerodynamic field or the thermodynamic cycle is the one of an engine component selected amongst a blower, an air input, a compressor stage and a turbine stage.

Preferably, the ambient air temperature probe can be arranged at the air input of the engine.

Including, the aerodynamic field of the blower can be modelled from data from the blower rotation speed sensor, the "engine" static pressure probes arranged upstream and/or downstream from the blower and the air temperature.

The detectors are associated with transducer systems being able to convert the signals into representative signals of static pressure, rotation speed and temperature parameters, and to transmit such signals to the data processing unit. Such a processing unit is then ready to transmit, from such signals, pod static pressure and engine total pressure data to at least one of the systems at the engine level so as to determine air speed data under a form being adapted for the needs, in particular under the form of conventional speed and Mach number.

According to a preferred embodiment, the aircraft also comprising anemometric measuring units, the systems at the airplane engine receiving pod static pressure and engine total pressure data also receive anemometric data thru a connection with said anemometric units and is able to implement the air speed and anemometric data as a function of the needs.

BRIEF DESCRIPTION OF THE FIGURES

Other data, characteristics and advantages of the present invention will appear when reading the non limited following description in reference to the accompanying FIGS., wherein, respectively.

DETAILED DESCRIPTION OF AN EMBODIMENT

Figure 1:
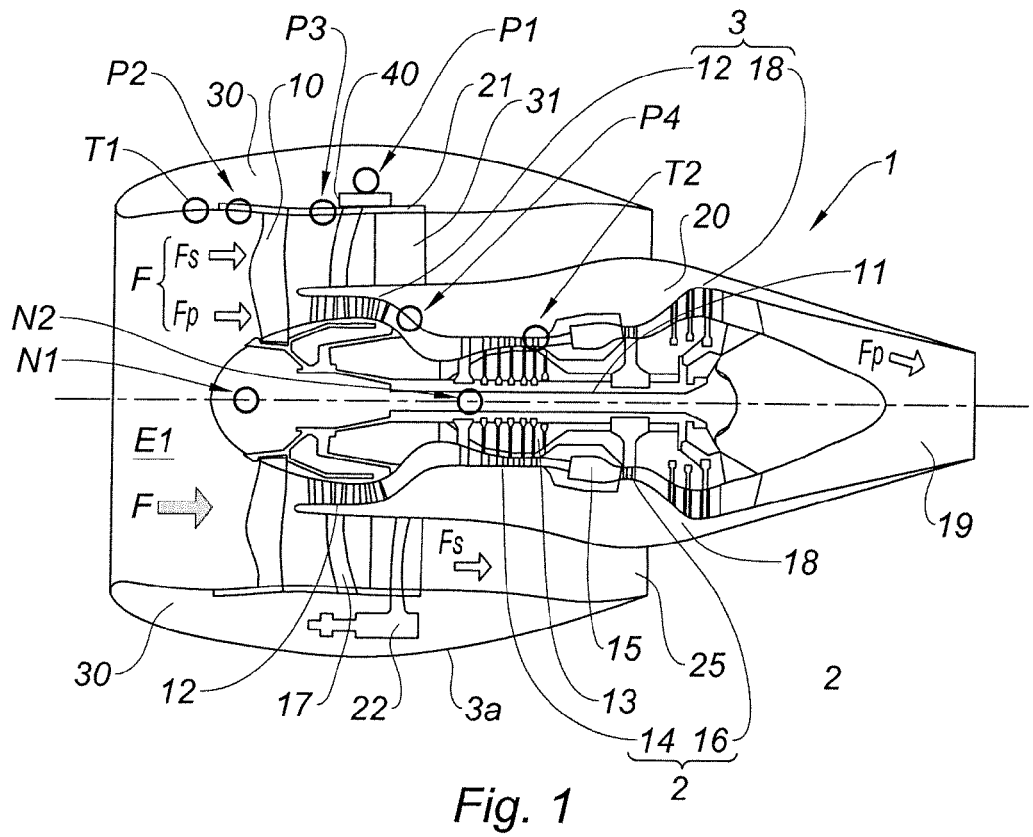
FIG. 1 is a sectional schema of an aircraft engine equipped with measuring detectors intervening in the supply of an air speed of the aircraft according to the invention.

Referring to the sectional view of FIG. 1, a turbojet 1 of an aircraft comprises from upstream to downstream relative to air flow stream symbolized by the arrow F from the air input E1: a blower 10, compressors BP 12 and HP 14, a combustion chamber 15, expansion turbines HP 16 and BP 18, and an exhaust pipe 19. The compression and expansion stages HP and BP respectively form, in connection with driving shafts 13 and 11, hitches HP 2 and BP 3. A fairing 20 protects the whole hitches HP and BP up to the primary exhaust pipe 19 and a blower casing 21 is supported by arms 31. The pod 30 is mounted on the casing 21 and on the engine attaching strut (not represented on FIG.).

The input air flow F is accelerated thru the blower 10, and then straightened via straighteners 17 so as to form the secondary flow Fs. Such a flow Fs circulate between the fairing 20 and the pod 30 before being ejected thru the secondary pipe 25.

The central flow of the input flow forms a primary flow Fp which is pressed, burnt and expanded in the hitches HP 2 and BP 3. Such primary flow Fp then performs with the secondary flow Fs being straightened the propulsion of the aircraft. The primary flow Fp being expanded also allows the other energy needs of the aircraft (pneumatic, electrical and hydraulic energies) to be satisfied via a case of accessories 22. The residual gases of the primary flow Fp exhaust thru the primary tube 19.

Moreover, the turbojet 1 is conventionally equipped with a great number of detectors: pressure probes, speed sensors and temperature sensors for the components of the hitches HP 2 and BP 3 (compressors BP 12 and HP 14, turbines BP 16 and HP 18) and of the blower 10. The condition of the engines is monitored and regulated by transmitting data supplied by such detectors, the so-called "engine parameters", to a processing unit 40 of a FADEC (for "Full Authority Digital Engine Control") type. Such unit enables in particular to pilot the flow rate of the fuel pump so as to regulate the combustion as a function of the engine parameters. The unit 40 is arranged on the casing 21 of the blower.

According to the invention, "pod" and "engine" pressure parameters are selected to determine respectively from the ambient air static pressure and the total pressure, an air speed for the aircraft and to supply such speed information to systems "at the airplane level". The total pressure calls up—beside the ambient air static pressure—other measurements of static pressures and models of the internal operation of the engine.

In one example, as illustrated in particular by the schema of FIG. 1, there are selected: the probe P1 for measuring the ambient air static pressure arranged under the pod 30, i.e. between the external cowl 3a and the internal cowl 3b of such pod; the output pressure probe P4 for the compressor; as well as the rotation speed sensor N1 for the blower 10 and, at the air input E1 of the turbojet 1, the air temperature probe T1. The data of the probes P1 to P3 as well as those of the sensor N1 are transmitted to the processing unit.

Figure 2:
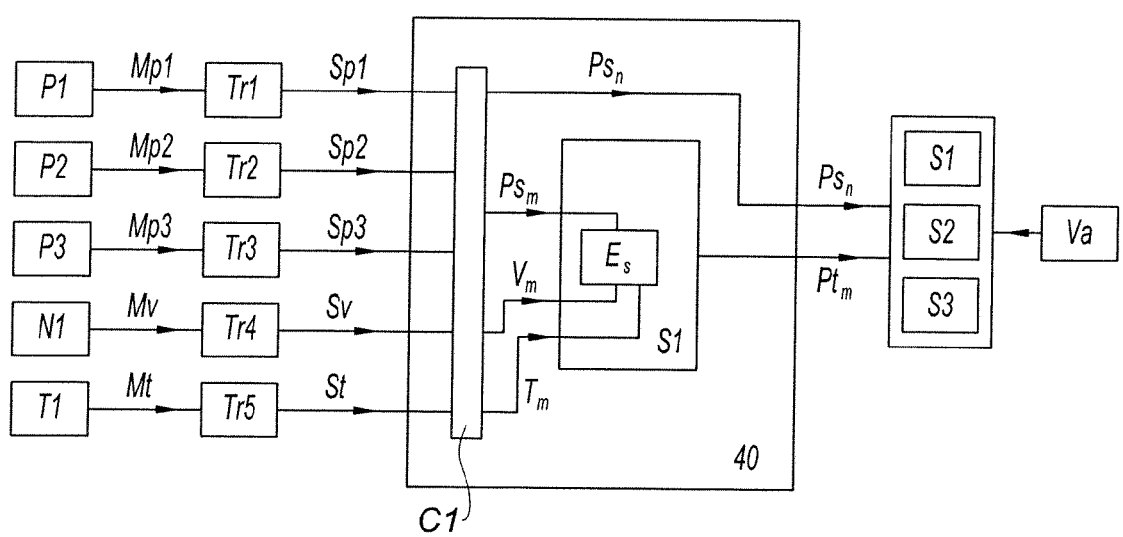
FIG. 2 is a functional diagram for developing and using air speeds of the aircraft according to the method of the invention.

As illustrated by the diagram of FIG. 2, the measurements of the ambient air Mp1 and "engine" Mp2, Mp3 static pressures, of the speed of blower Mv and of the air temperature Mt, respectively supplied by the detectors P1 to P3, N1 and T1, are converted into electrical signals Sp1 to Sp3, Sv and St by appropriate transducers Tr1 to Tr5 being known, from the man skilled in the art. Such signals are then converted into digital data in an analogical/digital converter C1 of the digital processing unit 40. The signals of the ambient air static pressure Sp1 are converted into digital data of "pod" static pressure $Ps_n$.

Furthermore, the engine static pressure signals Sp2 and Sp3 are converted into an "engine" static pressure $Ps_m$ used in a simulator S1. The pressure $Ps_m$ results from the combination of both signals Sp2 and Sp3 digitized by the converter C1. Alternatively, the converter can transmit both signals Sp2 and Sp3 to the simulator S1 after digitization. Finally, the speed Sv and temperature St signals are converted into digital data Vm and Tm via the converter.

The "pod" static pressure $Ps_n$ is formed with digital data corresponding to the measurements Mp1, whereas the total pressure $Pt_m$ is deduced from the input of data $Ps_n$, $Ps_m$, Vm and Tm, corresponding to the measurements Mp1, Mp2 and/or Mp3, N1 and T1, in the simulator S1. Such a simulator uses the modeling parts of the thermodynamic cycle or the aerodynamic field of the engine component being selected, thereby forming an extract Es of the complete thermodynamic cycle of the engine (engine modeling hereinunder).

In such non limiting example, the aerodynamic field of the blower 10 is modelled and the parameters $Ps_m$, Vm and Tm are used in an extract Es of the engine modeling, such an extract forming a modeling of the aerodynamic field of the blower 10. The engine modeling and the means for extracting such modeling so as to form specific models of engine components are known from the man skilled in the art.

The unit 40 then transmits data $Ps_n$ and $Pt_m$ to the systems S1 to S3 at the airplane level thereby determining the air speed of the aircraft under forms being adapted for the use of such speed information. Such systems S1 to S3 are dedicated, in the example being illustrated, respectively to the displays of the cockpit, to the alarms of the anemometric unit Sa and to the flight commands. In other alternatives, data are supplied to a sub-assembly of such systems and/or to the anemometric system or unit Sa.

For example, it is possible to determine data of conventional air speed Vc and Mach number $M_n$ thru the known formulas:

$$V_c = \sqrt{5x\left[\left(\frac{Pt_m - Ps_n}{P_0} + 1\right)^{2/7} - 1\right]}$$

with $P_0$=reference static pressure (atmospheric pressure of 1013,25 mbars), and $$M_n = \sqrt{5x\left[\left(\frac{Pt_m}{Ps_n}\right)^{2/7} - 1\right]}$$

So as to avoid too a big fluctuation of the data flow being thus determined, it is advantageous to filter the parameters $Ps_n$ and $Pt_m$ according to an appropriate passband. Also, the values of Vc and Mn are advantageously filtered as un function of the needs of the user.

Consequently, each turbojet is able to supply pressure $Ps_n$ and $Pt_m$ data and thus potentially speed Vc and Mn data. Furthermore, anemometric speed Va data of the anemometric system can also be supplied for example to the airplane monitoring systems so as to constitute different sources. The speed data relative to each turbojet constitute then as many alternative sources of speed information as the number of turbojets the aircraft is equipped with for the airplane systems.

Such sources and speed data Va of the anemometric units Sa can be combined according to the invention for each airplane system as a function of the needs.

Of course, the invention is not limited to the embodiments being described and represented. In particular, other modeling extracts can be used. For example, referring to FIG. 2, the aerodynamic field of a compressor 12 or 14 can be modelled by entering measuring data of a speed sensor N2 of such a compressor, probes for air static pressures P2 and P3 arranged upstream and downstream from such a compressor, a pressure probe P4 in output of the compressor and the air temperature sensor T2 on one point of the compressor. Furthermore, the determination of the engine air speeds can be performed by the processing unit and then transmitted at the airplane level or directly at the airplane level by the airplane systems.

The invention claimed is:

1. A method for determining an air speed of an aircraft comprising
    an airplane level including at least display, monitoring, alarm, navigation, and flight control systems at a cockpit and
    an engine level distinct from the airplane level and including
        a processing unit
        engines, each including at least one pod and
        one air compression/gas expansion hitch,
    the method comprising:
    measuring, at the engine level, a pod static pressure from ambient air located under the at least one pod of a first engine;
    determining, at the engine level, an engine total pressure by measuring a plurality of engine parameter values at a selected engine component and then simulating a model of an aerodynamic field and/or a thermodynamic cycle of the selected engine component to deduce the engine total pressure;
    calculating the air speed of the aircraft using the pod static pressure and the engine total pressure determined at the engine level;
    transmitting the air speed calculated using the pod static pressure and the engine total pressure to selected systems at the airplane level; and
    controlling the selected systems at the airplane level using the air speed calculated using the pod static pressure and the engine total pressure.

2. The method according to claim 1, wherein calculating the air speed of the aircraft using the pod static pressure and the engine total pressure is performed either at the airplane level or in an intermediate processing at the engine level, and then transmitted to the airplane level.

3. The method according to claim 1, wherein the selected engine component is a compressor, and measuring the plurality of engine parameter values during determining the engine total pressure further comprises:
    measuring an air static pressure both upstream and downstream of the compressor, a compressor output pressure, a rotation speed of the compressor, and an air temperature at the compressor.

4. The method according to claim 1, wherein the selected engine component is a blower, and measuring the plurality of engine parameter values during determining the engine total pressure further comprises:
    measuring an air static pressure both upstream and downstream of the blower, a blower output pressure, a rotation speed of the blower, and an air temperature at the blower.

5. The method according to claim 1, further comprising:
    repeating the measuring, determining, and calculating the air speed steps for each other engine at the engine level; and
    transmitting the air speed calculated from each engine at the engine level to the selected systems at the airplane level, thereby providing the selected systems with as many alternative sources of speed information as numbers of engines in the aircraft.

6. The method according to claim 1, wherein the airplane level also includes an anemometric measuring unit positioned in a front part of the aircraft, and the method further comprises:
    measuring an anemometric air speed of the aircraft with the anemometric measuring unit; and
    transmitting the anemometric air speed to the selected systems at the airplane level of the aircraft such that the selected systems receive different sources of air speed determinations, at least one of which is based on measurements at only the airplane level and at least another of which is based on measurements at only the engine level.

7. An aircraft configured to determine an air speed, comprising:
- an airplane level including displaying, monitoring, navigation, alarm, and flight control systems at a cockpit; and
- an engine level distinct from the airplane level and including
  - a processing unit and
  - at least one engine, each engine including
    - at least one pod,
    - an air compression/gas expansion hitch, and
    - a selected engine component,
  - the processing unit
    - receiving a pod static pressure measured at the engine level ambient air located under the at least one pod of a first engine and
    - determining an engine total pressure by simulating a model of an aerodynamic field and/or a thermodynamic cycle of the selected engine component of the first engine using measurements of a plurality of engine parameter values at the selected engine component, to thereby enable the air speed of the aircraft to be calculated using the pod static pressure and the engine total pressure,
  - wherein selected systems at the airplane level are controlled using the air speed of the aircraft that is calculated using the pod static pressure and the engine total pressure.

8. The aircraft according to claim 7, wherein the selected systems at the airplane level include a calculation device that calculates the air speed of the aircraft using the pod static pressure and the engine total pressure so as to determine air speed data in the form of a conventional speed and a Mach number.

9. The aircraft according to claim 7, wherein the air temperature probe is located at an air input of the first engine.

10. The aircraft according to claim 7, wherein the airplane level also includes an anemometric measuring unit positioned in a front part of the aircraft and measuring an anemometric air speed of the aircraft, wherein the selected systems at the airplane level receive different sources of air speed determinations, at least one of which is based on measurements at only the airplane level and at least another of which is based on measurements at only the engine level.

11. The aircraft according to claim 7, wherein the selected engine component is associated with a plurality of pressure probes, a rotation speed sensor, and an air temperature probe, and wherein the engine parameter values measured at the selected engine component further include an air static pressure and an output pressure from the plurality of pressure probes, a speed from the rotation speed sensor, and a temperature from the air temperature probe.

12. The aircraft according to claim 11, wherein the selected engine component is chosen as one of: a blower, an air input, a compressor, and a turbine.

13. The aircraft according to claim 12, wherein the selected engine component of the first engine is the blower, and the aerodynamic field of the blower is modeled using a blower speed measured by the rotation speed sensor, an air temperature at the blower measured by the air temperature probe, an air static pressure both upstream and downstream of the blower measured by the plurality of pressure probes, and a blower output pressure measured by one of the plurality of pressure probes.

14. The aircraft according to claim 12, wherein the selected engine component of the first engine is the compressor, and the aerodynamic field of the compressor is modeled using a compressor speed measured by the rotation speed sensor, an air temperature at the compressor measured by the air temperature probe, an air static pressure both upstream and downstream of the compressor measured by the plurality of pressure probes, and a compressor output pressure measured by one of the plurality of pressure probes.

15. The aircraft according to claim 11, wherein the engine level further includes transducer systems being able to convert measurements of parameters supplied by the plurality of pressure probes, the rotation speed sensor, and the air temperature probe into signals representative of parameters of static pressure, rotation speed and temperature, and to transmit the signals to the processing unit.

* * * * *